United States Patent
Mosko et al.

(10) Patent No.: US 9,444,722 B2
(45) Date of Patent: Sep. 13, 2016

(54) METHOD AND APPARATUS FOR CONFIGURING ROUTING PATHS IN A CUSTODIAN-BASED ROUTING ARCHITECTURE

(71) Applicant: Palo Alto Research Center Incorporated, Palo Alto, CA (US)

(72) Inventors: Marc E. Mosko, Santa Cruz, CA (US); Van L. Jacobson, Woodside, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 540 days.

(21) Appl. No.: 13/957,263

(22) Filed: Aug. 1, 2013

(65) Prior Publication Data

US 2015/0036535 A1    Feb. 5, 2015

(51) Int. Cl.
*H04L 12/721* (2013.01)
*H04L 12/751* (2013.01)
*H04L 12/715* (2013.01)

(52) U.S. Cl.
CPC ............. *H04L 45/123* (2013.01); *H04L 45/02* (2013.01); *H04L 45/04* (2013.01)

(58) Field of Classification Search
None
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Hicham Foud
(74) *Attorney, Agent, or Firm* — Shun Yao; Park, Vaughan, Fleming & Dowler LLP

(57) ABSTRACT

A network-connectivity system uses one or more local endpoints to establish a set of directed network connections across network domains. During operation, the system determines a first network domain which is to function as a via that communicates data from other network devices to a predetermined endpoint of a local domain. The system then generates a via-domain description, which references the first network domain as a via for the local domain. The system also determines a second network domain which is to function as a proxy that communicates data to other network domains from a predetermined endpoint of the local domain. The system generates a proxy-domain description, which references the second network domain as a proxy for the local domain. The system then synchronizes the via-domain description with devices of the first network domain, and synchronizes the proxy-domain description with devices of the second network domain.

20 Claims, 11 Drawing Sheets

(56) References Cited

U.S. PATENT DOCUMENTS

| | | | |
|---|---|---|---|
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 * | 3/2014 | Bhimaraju ............ H04L 63/083 |
| | | | 726/2 |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0203804 A1 * | 9/2006 | Whitmore ............ H04L 12/5692 |
| | | | 370/352 |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |

(56) References Cited

U.S. PATENT DOCUMENTS

| | | |
|---|---|---|
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0094876 A1* | 4/2010 | Huang ............ G06F 17/30876 707/741 |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1* | 1/2011 | Iovanna ............. H04L 45/02 370/392 |
| 2011/0022812 A1 | 1/2011 | van der Linden et al. |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |

(56) References Cited

U.S. PATENT DOCUMENTS

| | | |
|---|---|---|
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336103 A1* | 12/2013 | Vasseur .................. H04L 41/12 370/216 |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Hogue et al., 'NLSR: Named-data Link State Routing Protocol', Aug. 12, 2013, ICN 2013, pp. 15-20.

lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn$2E.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusi.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Sympo.

H. Xiong, X. Zhang, W. Zhu, and D. Yao. CloudSeal: End-to$2.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer Sciencevol. 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matted Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Mobility First Project [online], http://mobilityfirst.winlab.rutgers.edu/, Downloaded Mar. 9, 2015.

Narasimhan, Sriram, and Lee Brownston. "HyDE-A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

(56) References Cited

OTHER PUBLICATIONS

Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

METHOD AND APPARATUS FOR CONFIGURING ROUTING PATHS IN A CUSTODIAN-BASED ROUTING ARCHITECTURE

RELATED APPLICATION

The subject matter of this application is related to the subject matter of the following applications:

U.S. patent application Ser. No. 12/970,740, entitled "CUSTODIAN-BASED ROUTING IN CONTENT-CENTRIC NETWORKS," by inventors Van L. Jacobson and Marc E. Mosko, filed 16 Dec. 2010;

U.S. patent application Ser. No. 12/970,819, entitled "SIP-BASED CUSTODIAN ROUTING IN CONTENT-CENTRIC NETWORKS," by inventors Marc E. Mosko and Simon Barber, filed 16 Dec. 2010; and U.S. patent application Ser. No. 13/681,306, entitled "DATA TRANSPORT BY NAMED CONTENT SYNCHRONIZATION," by inventors Van L. Jacobson and Marc E. Mosko, filed 19 Nov. 2012;

U.S. patent application Ser. No. 13/720,736, entitled "DYNAMIC ROUTING PROTOCOLS USING DATABASE SYNCHRONIZATION," by inventors Van L. Jacobson and Marc E. Mosko, filed 19 Dec. 2012;

the disclosures of which are incorporated by reference in their entirety herein.

BACKGROUND

1. Field

This disclosure is generally related to computer networks. More specifically, this disclosure is related to establishing directed routing paths across network nodes of a computer network using database synchronization operations.

2. Related Art

Link-based routing protocols, such as Intermediate System to Intermediate System (IS-IS) and Open Shortest Path First (OSPF), are designed to establish symmetric links between neighboring network nodes. Each network node propagates link state information across a network by sending link-state advertisements (LSAs) to neighboring network nodes. When a network node receives an LSA, the network node can create an updated graph for the map of the network, and updates a routing table to indicate a first node along a shortest path to each network node.

In link-based routing protocols, it is important that all nodes of a computer network operate under the same network map to prevent forwarding packets in a routing loop within the network. To maintain a synchronized network map, network nodes propagate a received LSA to other neighboring nodes of the computer network, which allows other neighboring nodes to update their routing table. Hence, because two network nodes of a computer network store the same network map, they may use the same links to route packets to each other, in opposite directions.

However, some users may not wish their devices to use the same links to send and to receive packets. For example, a user's smartphone may typically download a substantially larger number of packets than it uploads, given that the downloaded packets may typically correspond to media content that can consume significant network bandwidth. On the other hand, the smartphone's uploaded packets may correspond to relatively small pieces of data, such as an email or a Short Messaging Service (SMS) message, a request for content (e.g., a hypertext transfer protocol (HTTP) request to view a website).

If the user's cellular network provider provides a quota to the amount of bandwidth accessed by the user's smartphone, the user may prefer that his smartphone to use a Wi-Fi network connection to receive packets, while allowing his smartphone to use either the Wi-Fi connection or a cellular network connection to send packets. Unfortunately, typical link-state routing protocols do not allow the user to control which links are to be used to send packets to, or to receive packets from, the user's computing device.

SUMMARY

One embodiment provides a network-connectivity system that uses one or more local endpoints to establish a set of directed network connections across a set of network domains. During operation, the system can determine a first network domain which is to function as a "via" for devices of a local domain. This via is to route packets from other network devices to a predetermined endpoint of the local domain. The system generates or updates a via-domain description, within a routing-data collection for the local domain, to reference a via-domain description of the first network domain. Updating the via-domain description to reference the via-domain description of the first network domain effectively establishes the first network domain as a via for the local domain.

The system can also determine a second network domain which is to function as a "proxy" for devices of the local domain. This proxy is to communicate data to other network devices from a predetermined endpoint of the local domain. The system generates or updates a proxy-domain description, within a routing-data collection for the local domain, to reference a proxy-domain description of the second network domain, thereby establishing the second network domain as a proxy for the local domain. The system then synchronizes a network-configuration collection, which includes the routing-data collection for the local domain, with at least the first network domain and the second network domain to provide the via-domain description to devices of the first network domain, and to provide the proxy-domain description to devices of the second network domain.

In some embodiments, the first and second network domains are different network domains. Further, while synchronizing the network-configuration collection, the system restricts the via-domain description from being provided to devices of the second network domain, and restricts the proxy-domain description from being provided to devices of the first network domain.

In some embodiments, when the system determines that a third network device has referenced the local device as a via, the system can generate or update a transit-domain description, within a routing-data collection for the local domain, to reference a transit-domain description of the third network domain, thereby establishing the third network domain as a transit destination. The system then synchronizes the routing-data collection for the local domain with devices of other domains to provide the transit configuration to the other network domains.

In some embodiments, the transit configuration indicates an endpoint of the local domain, which devices of the other network domains may use to send packets for the third network domain, and/or indicates a reference to a transit-domain description of the third network domain.

In some embodiments, the via-entities configuration indicates an endpoint of the local domain from which devices of other network domains may receive packets from the local domain, and/or indicates a reference to a proxy-domains description for at least the second network domain.

In some embodiments, the proxy configuration indicates an endpoint of the local domain, which other network domains may use to send packets to devices of the local domain, and/or indicates a reference to a via-domain description of the first network domain.

In some embodiments, the system can configure the local computing device to function as a "supernode" of a computer network. The system selects an endpoint of the local domain to designate as a supernode endpoint that is to function as a network interface for a set of network domains, and assigns the selected endpoint to a supernode-endpoint tier. The system then updates a custodian-to-endpoint table to designate the local endpoint as a supernode endpoint, and to associate the selected endpoint to the corresponding supernode-endpoint tier, and synchronizes the custodian-to-endpoint table with devices of other network domains to advertise the supernode endpoint to the other network domains.

In some embodiments, can update an in-memory custodian-to-endpoint table to reflect changes to a routing-data collection, for example, in response to synchronizing the collection with one or more peer network devices. When the system determines that the routing-data collection for the local domain includes an update to one or more routing-configuration descriptions, the system disseminates an interest directed to the routing-data collection for the local domain. In response to disseminating the interest, the system obtains routing-configuration descriptions for the local domain, and determines a set of endpoint objects referenced by the routing-configuration descriptions. The system can then update an in-memory custodian-to-endpoint table to include the determined set of endpoint objects.

In some embodiments, the system can send a packet to a target remote device using a proxy for the local computing device. The system determines a target network device that is a destination for a data packet, and identifies an endpoint for the target network device using a custodian-to-endpoints table. The system generates a directed network path to the identified endpoint based on via-domain descriptions for a plurality of network domains. Then, the system selects an endpoint for a network domain at the start of the directed network path, and sends the data packet to the selected endpoint.

BRIEF DESCRIPTION OF THE FIGURES

In the figures, like reference numerals refer to the same figure elements.

DETAILED DESCRIPTION

Figure 1:
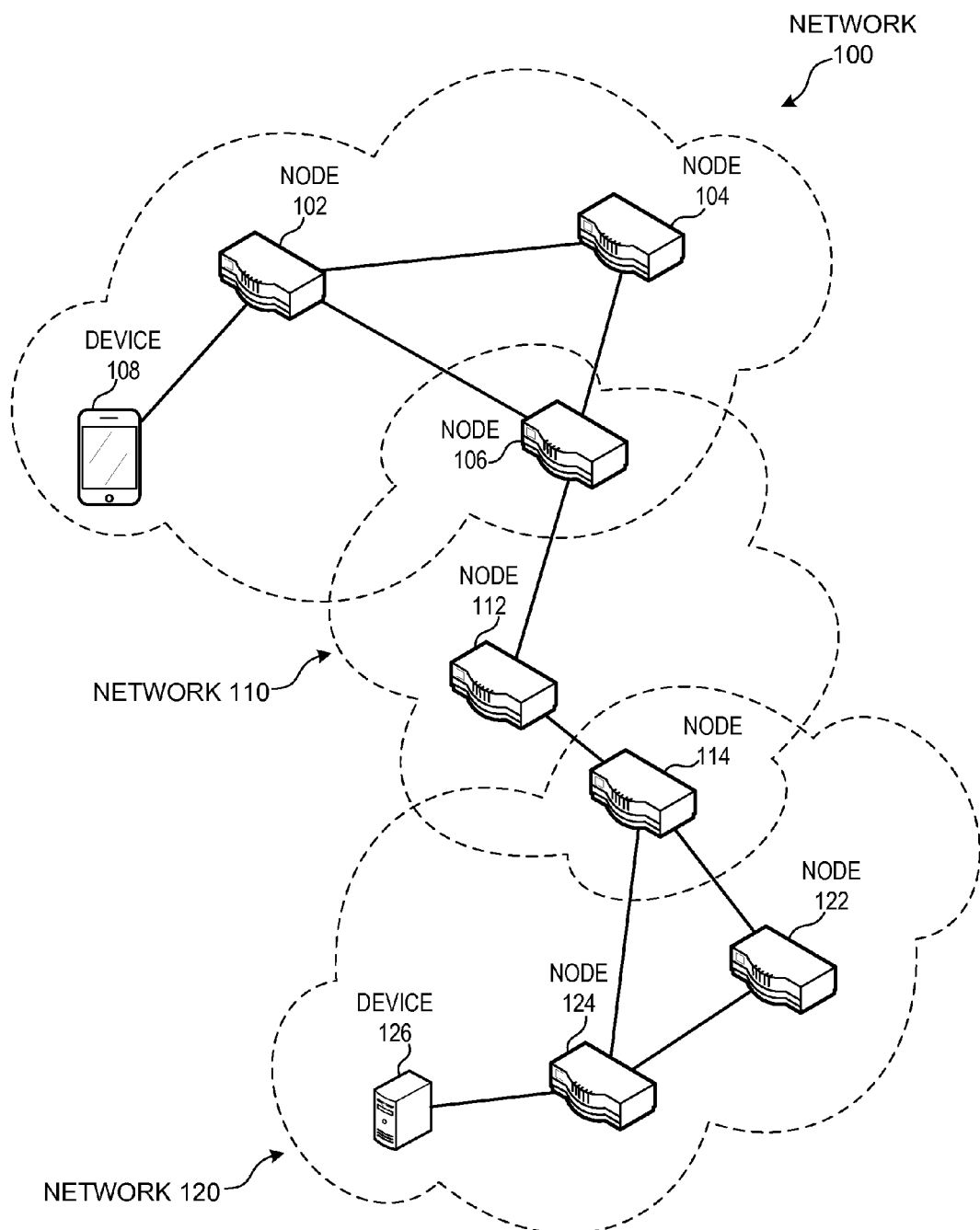
FIG. 1 illustrates exemplary computer networks in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a network-connectivity system, which solves the problem of efficiently routing packets over directed paths of a structured network. For example, a user can own several devices, and can organize these devices into a device community, known as a Service Enhanced Network (SEN) Virtual Private Community (VPC), that organizes a user's computing devices into a social graph. These devices can establish "Via" or "Proxy" associations to designate other devices to process their incoming or outgoing network traffic, respectively. The network-connectivity system can implement a VPC Connectivity Agent (VCA) that can efficiently synchronize connectivity information across nodes of a device community to form a social graph, which ensures that VPC members remain aware of the available Via and Proxy associations in the VPC. This allows the user's various devices to securely communicate data across the VPC to provide services to the user.

A VPC can have several domain levels: User (VPC domain level "1," or VPC1); Home (VPC domain level "2," or VPC2); and Group (VPC domain level "3," or VPC3). For example, a device belongs to one User, who may have several devices. A User belongs to one Home, which may include several Users. Users and Homes may belong to zero or more Groups. The associations between devices and VPC domains (e.g., devices and users and homes and groups) are authenticated using cryptographic methods to provide secure relationships between these entities.

In a content-centric network (CCN), a packet-forwarding device (e.g., a router) can store a Forwarding Information Base (FIB) to map a location independent structured name for a piece of content (e.g., a Hierarchically Structured Variable-Length Identifier, or HSVLI) to a custodian for the content. When the device receives an interest in a piece of content, the device can perform a lookup operation on the FIB to identify a custodian that provides the content. The packet-forwarding device may also store a custodian-to-endpoint (CE) table, which maps a custodian to one or more endpoints from which the custodian can be reached.

However, as stated above, the VPC can include a set of consumer devices (e.g., a smartphone or a laptop computer), which may be members of the same VPC Group, or different VPC Groups. Devices in the VPC can specify connections to other devices that they can use to communicate outbound traffic, or to receive inbound traffic, and they advertise these directed connections to the other devices in the SEN VPC. For example, a device or VPC domain can designate one or more other VPC domains as a "Via" from which it can receive incoming packets. The network device or VPC domain can also designate other VPC domains as a "Proxy" from which it can send outbound packets.

During operation, the network devices within a SEN VPC need to synchronize their network associations with the other devices in the VPC. For example, if the connectivity state for a directed connection changes (e.g., a Via or Proxy to the device goes offline). A network device synchronizes his updated network associations with the other SEN VPC devices, which allows the other network devices to establish a directed path to a target VPC device using only the directed connections that are operational.

The following terms are used throughout the following sections to describe the network-connectivity system.

Face: "Face" refers to an abstraction of a network interface. A "face" may indicate an application running on a local device, an attached network accessible by the local device, or to a tunnel to a remote system. Each face has one or more prefix registrations. A prefix registration specifies a longest-matching-prefix content name (e.g., an HSVLI) that may be routed over that face. If there are multiple faces with the same prefix, the system may use a load-sharing strategy to distribute the network traffic over the various faces. For example, the system may weight each face by its performance, and favors sending more traffic over faces that provide better performance (e.g., as measured by a content retrieval round-trip-time).

Endpoint: An "Endpoint" refers to a network identity of a node. Hence, an Endpoint may indicate an IP address, a SIP address, or some other connection method, such as a Direct Interface. Each network node stores an Endpoints table, which includes a list of the network node's Endpoints, along with attributes for each Endpoint. An Endpoint attribute can indicate, for example, a restriction on which other nodes can use the Endpoint, a preference value for using the Endpoint compared to other Endpoints, or other attributes now known or later developed.

Domain: A VPC "domain" can include a social group, which can include one or more devices that share data over the VPC. These domains can include several devices that belong to a single user, or to multiple users. For example, a single-user domain can include the user's smartphone, laptop, and/or a home-media computer. As another example, a multi-user domain can include devices that belong to several different people, such as in a "Home" domain, or in an "Office" domain.

VPC Association: The VPC Association provides a strong cryptographic association, or cryptographic binding, between a pair of VPC domains. For example, two endpoint devices may communicate with each other when they have established a VPC Association, and they may communicate over a directed path of devices to which they may or may not have a VPC association.

Via: The Via relationship is an explicit, directed network association between two domains, where one domain grants another domain the ability to route inbound traffic "via" the other domain. For example, a local domain can establish a Via relationship with a network peer, which makes the network peer a "Transit" for the local domain. The Via relationship is a non-VPC association between the two domains, which does not provide a cryptographic binding, and does not imply any "browsing" privileges of domain content. However, two domains that have a VPC association can establish a directed network connection though one or more Vias, even if the two domains do not have a VPC binding to the Vias, or if the Vias do not have a VPC association with each other.

Proxy: Similar to a Via, the Proxy relationship is an explicit, directed network association between two domains. However, a local domain establishes a Proxy relationship with another domain to grant the other domain the ability to route outbound traffic for the local domain. The Proxy relationship is also a non-VPC association, which does not provide a cryptographic binding and does not imply any "browsing" privileges of domain content.

Supernode: The supernode relationship is an intra-domain organization similar to a hub, where routing within the domain is done through these peering points. However, unlike in a "hub," a supernode Endpoint does not require devices (e.g., phones) to adopt a static hub-centric routing behavior.

In some embodiments, supernodes provide a performance optimization for a domain that includes a large and flat namespace collection (e.g., a namespace collection with minimal hierarchy), such as in a VPC3 network. For example, a given VP3 domain (e.g., a "Group" domain) may include devices that belong to a set of users, and/or devices from various physical networks. However, these individual devices may belong to different VPC2 networks, and the number of devices may require an undesirably large custodian-to-endpoint (CE) table to be stored in memory for mapping a device's name to its endpoints. Hence, by using supernodes as a hub between devices in different VPC2 networks, the devices in one VPC2 network can reduce the CE table to include entries for devices in its local VPC2 network, and to include an entry for a supernode for each of the other VPC2 networks.

Vias may also be useful for VPC3 memberships. For example, a VPC1 entity that belongs to a VPC3 group can use Vias to configure inbound traffic to flow through hubs in a certain VPC2 domain, even when these VPC2 hubs are not a member of the VP3 group. As another example, a set of devices can use Vias to realize symmetric routing paths in a VPC domain, which facilitates routing packets through paths similar to the Open Shortest Path First (OSPF) routing protocol or the Border Gateway Protocol (BGP).

Proxies can be useful for routing outbound traffic for VPC3 members. For example, a VPC1 member that also belongs to a VPC3 domain can establish a Proxy to route its outbound traffic through a VPC2 hub, even when the VPC2 hub is not a member of the VPC3 domain. As another example, a device in a Direct network (e.g., a home Wi-Fi network) can configure a Proxy to route its outbound traffic through a local hub that is not the device's home hub.

In some embodiments, when a hub has an unsatisfied Interest for a foreign VPC2, the hub can directly contact a set of hubs in the foreign VPC2 (e.g., at most 2 hubs) to satisfy the interest. Alternatively, if a VPC2 specifies one or more Vias, the hub with the unsatisfied Interest can connect to a set of devices (e.g., at most 2 devices) in the Via domain to route to the destination. The Via lookup is recursive, so the hub would connect to the last Via in a Via chain (e.g., domain A may specify domain B as its Via, which in turn specifies domain C as its Via, etc.), or to the first Via that specifies the hub's domain as a Via. The hub would maintain performance data for the Vias, and for specific Endpoints of the Vias, and can use this performance data to select with which devices in the Via domain to connect.

FIG. 1 illustrates exemplary computer networks 100, 110, and 120 in accordance with an embodiment. Network 100 can include a plurality of network nodes 102, 104, 106, and 108 (e.g., routers and/or end-host devices) that form a network area 100 (e.g., "Area 1"). Each of these network nodes can store a local copy of a routing-data collection that includes configuration information for network 100, such as link state information. A network node can synchronize the routing-data collection with other nodes of the computer network by using the content-centric network to synchronize content items that belong to the domain "Area 1." These nodes can use network-configuration information of their local collection to maintain a forwarding table for the computer network.

For example, network 100 can include a computing device 108, which may be a mobile end-host device (e.g., a user's mobile phone, laptop, or any other personal computing device). When computing device 108 connects to network node 102, network device 102 can detect reachability information to device 108 and updates its local routing-data collection to reflect the reachability information. Then, to propagate the reachability information, node 102 can synchronize its routing-data collection for network 100 with other nodes of network 100. Network node 102 does not have to send a network-configuration item directly to other nodes of network 100, and does not have to keep track of which network-configuration items have been communicated to which neighboring nodes. After synchronizing their routing-data collection for network 100, network nodes 102-1106 can use the reachability information of their local routing-data collection to update their local forwarding table to determine a shortest path for routing data to device 108.

Similarly, network 120 can include an end-host computing device 126, which may be a file-server, or a home-media server. Network 120 can also include a set of data-forwarding devices 114, 122, and 124, such as network routers or switches. The devices of network 120 form a network "Area 2." Computing device 126 can connect to network device 124 to send data, or to receive data from other devises (e.g., from device 108). Network device 124 can detect reachability information to device 126, updates its local routing-data collection to reflect the reachability information, and can synchronize its routing-data collection with other nodes of network 100 to propagate the reachability information.

Network 110 can include a plurality of network nodes (e.g., routers) 106, 112, and 114 that form a network area 110 (e.g., "Area 3"), such as routers for an Internet Service Provider (ISP). Each of these network nodes stores a local copy of a routing-data collection that includes configuration information for network 120. Notice that network nodes 106 and 114 are border routers that belong to both network 100 and network 120. Thus, network nodes 106 and 114 may be Supernodes that facilitate creating network connections between "Area 1," "Area 2," and/or "Area 3." The other network nodes of network 120 (e.g., network node 112) belong only to "Area 2," and can only synchronize the collection for domain "Area 2" with the border routers (nodes 106 and 114).

In some embodiments, networks 100, 110, and 120 can belong to a VPC3 domain, such that nodes 106 and 114 are designated as supernodes for routing packets between networks 100, 110, and 120. The supernode relationship provides an intra-domain organization, similar to a hub, where routing within the domain is done through these peering points. Using supernodes facilitates a network node to reduce an average node degree when routing a data packet, while increasing deterministic behavior. A supernode, however, does not experience side effects associated with hubs. For example, having a hub means that phones may adopt a hub-centric routing behavior, or may use different Via configurations. If supernodes are not available or not reachable, a forwarding member of a VPC3 domain can revert to forwarding data packets using a Graph Search mechanism that determines a path through a set of Vias.

In addition to supernodes, a VPC3 domain can also include forwarding members and non-forwarding members. The non-forwarding members can include content producers, and/or content consumers, such as device 108 of network 100, or device 126 of network 120. The forwarding members, on the other hand, are configured to forward data packets to a target entity. For example, the VPC3 domain can include an Intelligent Mobile Device (IMD), such as a smartphone. The IMD is normally a non-forwarding member, and so it will not be contacted during a Graph Search operation. IMDs can also be "do-not-call" members, so forwarding members would not call these IMDs to find content. The IMD can participate in the VPC3 when the IMD makes a connection to a forwarding member, such as by calling a forwarding member.

For example, a VCA3 member device can specify, in its Endpoints table, if the member device is a forwarder or an end host (also called a non-forwarder). If the member device is a forwarder, the device can relay Interests to remote VCA devices. However, if the device is an end host, it only forwards Interests to local faces (e.g., to a local application). The end host may not be running an IP forwarder, so packets only go to local applications. The Interests received on the end host's local faces can be forwarded to the end host's remote faces (e.g., to disseminate an Interest), and Interests received on the end host's remote faces may only be forwarded to the end host's local faces (e.g., to process an incoming Interest locally).

Figure 2:
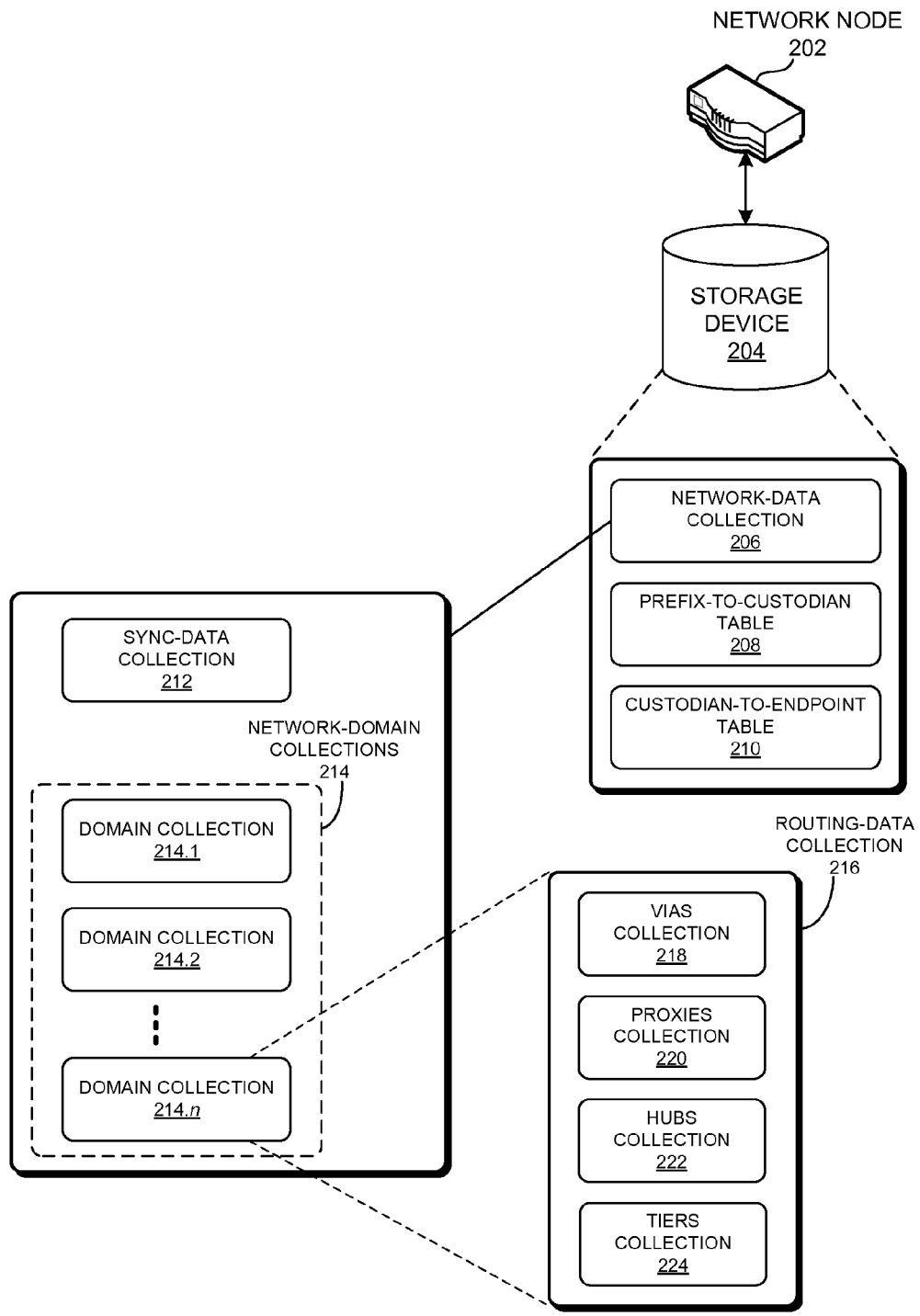
FIG. 2 illustrates an exemplary network node that stores routing-configuration data in accordance with an embodiment.

FIG. 2 illustrates an exemplary network node 202 that stores routing-configuration data in accordance with an embodiment. Specifically, network node 202 can include a storage device 204, which stores at least a network-data collection 206, a prefix-to-custodian (PC) table 208, and a custodian-to-endpoint (CE) table 210. PC table 208 maps a structured-name prefix (e.g., an HSVLI prefix) to an identifier for a custodian device associated with the prefix. CE table 210 maps a custodian to one or more endpoints from which the custodian can be reached.

Network-data collection 206 can include information which describes a Service-enhanced Network (SEN), which can be synchronized with other members of the SEN to disseminate or receive changes to the SEN configuration. For example, when network node 202 creates a Via association or a Proxy association, network node 202 can update network-data collection 206 to reflect the association, and synchronizes network-data collection 206 with other network nodes of a local VPC domain and/or other VPC domains. Similarly, network node 202 can learn about new Via or Proxy associations (or any other changes to the SEN configuration) for other network nodes when node 202 synchronizes network-data collection 206 with the other nodes.

In some embodiments, the content items stored in network-data collection 206 are associated with structured names, such as an HSVLI. For example, network-data collection 206 can be rooted by a namespace "/sen/" (or any other prefix for the service enhanced network), and the content items stored in network-data collection 206 can have namespaces with the prefix "/sen/."

Network-data collection 206 can store a Sync-data collection 212, whose namespace may be, for example, "/sen/sync/." Network-data collection 206 can also store a plurality of network-domain collections 214, which store network-configuration information for various VPC domains. For example, a domain-collection 214.1 can correspond to a domain "HomeA." Hence, the namespace for domain-collection 214.1 may be "/sen/HomeA/." Similarly, domain collections 214.2 and 214.*n* may correspond to domains "HomeB" and "HomeC," and the namespace for collections 218.2 and 218.*n* may be "/sen/HomeB/" and "/sen/HomeC/," respectively.

In some embodiments, domain collections 214 can store information associated with their corresponding VPC domains. Domain collection 214.*n*, for example, can store at least routing-data collection 216, which can have a namespace "/sen/HomeC/%C1.sen.routing/" for domain "HomeC." Routing-data collection 216 can store a Vias collection 218 and a Proxies collection 220 that store Via objects and Proxy objects, respectively, for a corresponding domain (e.g., HomeC). Routing-data collection 216 can also store a Hubs collection 222 and a Tiers collection 224 for the corresponding domain, which store descriptions for a set of hubs and VPC tiers associated with the corresponding domain.

The "Routine" Collection

Each VPC domain (e.g., domain "HomeA") can have a corresponding "routing" collection, which includes collection objects that facilitate establishing a connection with a VPC-related domain via a path of other domains. For example, a domain "HomeA" can have a routing-data collection under a namespace "/sen/HomeA/%C1.sen.routing/." This "routing" collection can store a description for Via domains within a "Vias" nested collection, and can store a description for proxy domains within a "Proxies" nested collection. The Via collection, under the "%C1.sen.routing" sub-namespace, uses collection objects to recursively dereference routing objects for other network devices or domains. These collection objects can be synchronized between various network devices to establish and maintain the Via and Proxy associations.

The Via and Proxy routing information can propagate across network nodes as described in the following example. A VPC network can include a set of domains, which are configured to route packets through each other, using directed paths. For example, a VPC2 domain "HomeA" can receive packets from a domain "HomeB" by having a Via of HomeB (e.g., HomeB is a Transit for HomeA). Also HomeB can receive packets from a domain "HomeC" by having a Via of HomeC (e.g., HomeC is a Transit for HomeB). To establish the Via associations, domains HomeA and HomeB synchronize with each other their Via configuration as described under their "Vias" collection (e.g., under the sub-namespace "%C1.sen.routing/Vias"). Domains HomeB and HomeC also synchronize their Via configuration with each other.

The Vias collection can store configuration information for Via objects, for example, under the sub-namespace "%C1.sen.routing/Vias". The "via_domains" collection can include recursive links or references to the domains that are used as Vias, as well as to the local domain's relays object. Also, the "transit_domains" collection includes links or references to the domains for which the local domain acts as a Via, and includes a link to the local relays object. The "relays" collection includes links to a set of local Endpoints to use as Vias or transits. The referenced Endpoints objects indicate the identity of the corresponding Endpoint, which may be used for DTLS or during prefix registration.

The "routing" collection can also include a "Proxies" nested collection (e.g., "% C1.sen.routing/Proxies"), which can store a configuration for Proxy objects. This Proxies collection can include a "proxy_domains" collection, a "proxied_domains" collection, and a "relays" collection. The "proxy_domains" collection can include recursive links or references to the domains that are used as proxies, as well as to the local domain's relays object. The "proxied_domains" collection includes recursive links to the domains for which the local domain acts as a proxy, as well as a link to the local relays object. The "relays" collection includes links to a set of local Endpoints to use as proxies.

Tables 1A and 1B present network-configuration information for a set of VPC domains in accordance with an embodiment. Specifically, the network-configuration information establishes directed routing paths using a set of Via and Proxy associations between domains "HomeA," "HomeB," and "HomeC." For example, the collection "/sen/HomeA/%C1.sen.routing/" provides the Vias and Proxy configurations for domain "HomeA," such that domain "HomeB" is a Via for domain HomeA, and domain "HomeC" is a Proxy for domain HomeA. Also, the collection "/sen/HomeB/% C1.sen.routing/" provides the Vias and Proxy configurations for domain "HomeB," such that domain "HomeC" is a Via and a Proxy for domain "HomeB."

TABLE 1A

Exemplary Routing-Data Collection Elements

/sen/HomeA/%C1.sen.routing/
  Vias/
    via_domains -> (link collection)
      -> /sen/HomeB/%C1.sen.routing/Vias/via_domains (recursive behavior)
      -> /sen/HomeA/%C1.sen.routing/Vias/relays (link to collection of Endpoints)
    transit_domains -> (link collection)
      -> /sen/HomeA/%C1.sen.routing/Vias/relays (link to collection of Endpoints)
    relays -> (link collection)
      -> /sen/HomeA/%C1.sen.routing/Hubs/DID(HubA1) (link to its Endpoint)

TABLE 1A-continued

Exemplary Routing-Data Collection Elements

```
Proxies/
    proxy_domains -> (link collection)
        -> /sen/HomeC/%C1.sen.routing/Proxies/proxy_domains (recursive link)
        -> /sen/HomeA/%C1.sen.routing/Proxies/relays (link to collection of Endpoints)
    proxied_domains -> (link collection)
        -> /sen/HomeA/%C1.sen.routing/Proxies/relays (link to collection of Endpoints)
    relays -> (link collection)
        -> /sen/HomeA/%C1.sen.routing/Hubs/DID(HubA2) (link to its Endpoint)
/sen/HomeB/%C1.sen.routing/
    Vias/
        via_domains -> (link collection)
            -> /sen/HomeC/%C1.sen.routing/Vias/via_domains (recursive link)
            -> /sen/HomeB/%C1.sen.routing/Vias/relays (link to collection of Endpoints)
        transit_domains -> (link collection)
            -> /sen/HomeB/%C1.sen.routing/Vias/relays (link to collection of Endpoints)
        relays -> (link collection)
            -> /sen/HomeB/%C1.sen.routing/Hubs/DID(HubB1) (link to its Endpoint)
            -> /sen/HomeB/%C1.sen.routing/Hubs/DID(HubB2) (link to its Endpoint)
    Proxies/
        proxy_domains -> (link collection)
            -> /sen/HomeC/%C1.sen.routing/Proxies/proxy_domains (recursive link)
            -> /sen/HomeB/%C1.sen.routing/Proxies/relays (link to collection of Endpoints)
        proxied_domains -> (link collection)
            -> /sen/HomeA/%C1.sen.routing/Proxies/proxied_object (recursive link)
            -> /sen/HomeB/%C1.sen.routing/Proxies/relays (link to collection of Endpoints)
        relays -> (link collection)
            -> /sen/HomeB/%C1.sen.routing/Hubs/DID(HubB1) (link to its Endpoint)
            -> /sen/HomeB/%C1.sen.routing/Hubs/DID(HubB2) (link to its Endpoint)
```

TABLE 1B

Exemplary Routing-Data Collection Elements (Cont'd)

```
/sen/HomeC/%C1.sen.routing/
    Vias/
        via_domains -> (link collection)
            -> /sen/HomeC/%C1.sen.routing/Vias/relays (link to collection of Endpoints)
        transit_domains -> (link collection)
            -> /sen/HomeB/%C1.sen.routing/Vias/transit_object (recursive link)
            -> /sen/HomeC/%C1.sen.routing/Vias/relays (link to collection of Endpoints)
        relays -> (link collection)
            -> /sen/HomeC/%C1.sen.routing/Hubs/DID(HubC1) (link to its Endpoint)
            -> /sen/HomeC/%C1.sen.routing/Hubs/DID(HubC2) (link to its Endpoint)
    Proxies/
        proxy_domains -> (link collection)
            -> /sen/HomeC/%C1.sen.routing/Proxies/relays (link to collection of Endpoints)
        proxied_domains -> (link collection)
            -> /sen/HomeA/%C1.sen.routing/Vias/transit_object (recursive behavior)
            -> /sen/HomeB/%C1.sen.routing/Proxies/proxied_object (recursive link)
            -> /sen/HomeC/%C1.sen.routing/Proxies/relays (link to collection of Endpoints)
        relays -> (link collection)
            -> /sen/HomeC/%C1.sen.routing/Hubs/DID(HubC1) (link to its Endpoint)
            -> /sen/HomeC/%C1.sen.routing/Hubs/DID(HubC2) (link to its Endpoint)
```

Figure 3:
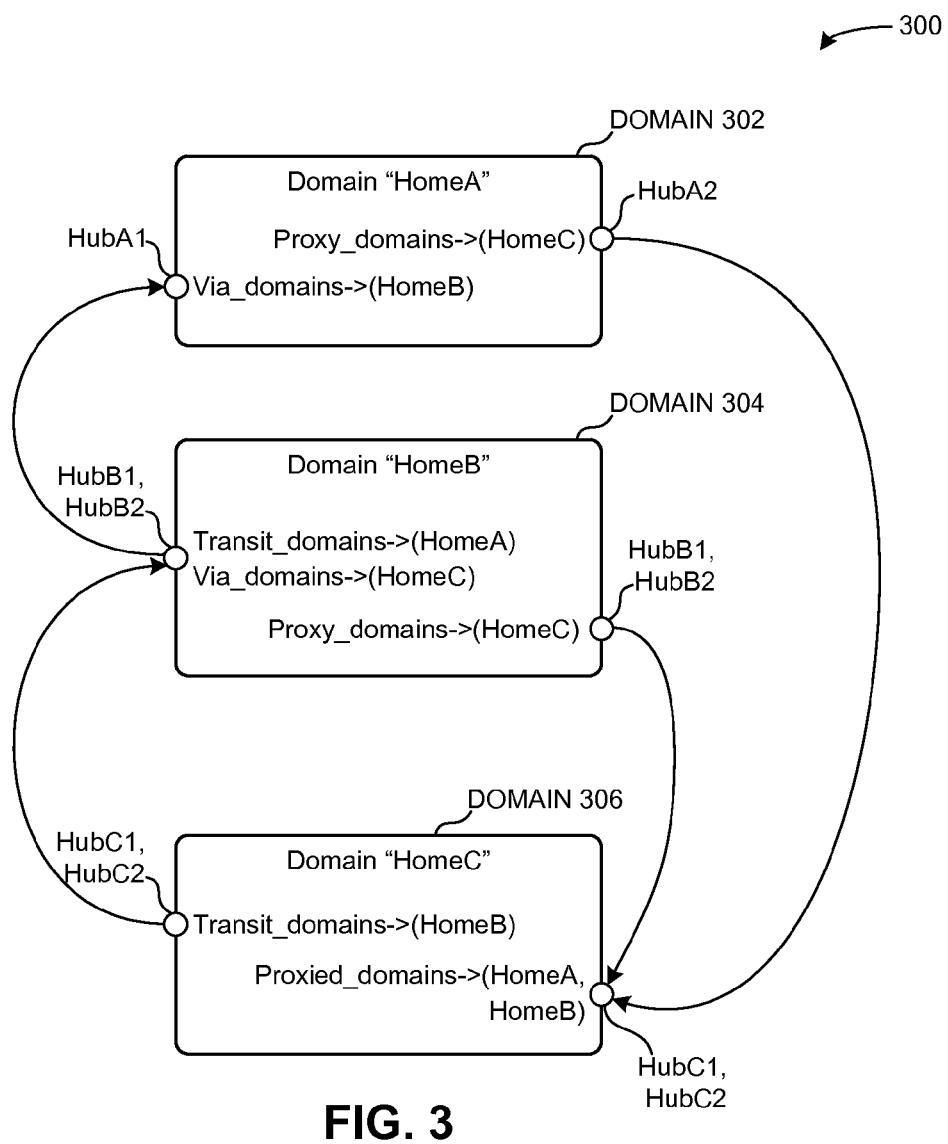
FIG. 3 illustrates a network configuration that includes a set of directed network paths for a set of VPC domains in accordance with an embodiment

FIG. 3 illustrates a network configuration 300 that includes a set of directed network paths for a set of VPC domains in accordance with an embodiment. Specifically, domains 302, 304, and 306 illustrate the routing configuration described in Tables 1A and 1B for domains "HomeA," "HomeB," and "HomeC," respectively. Domain HomeC is a Via for HomeB, and domain HomeB is a Via for HomeA. Also, domain HomeC is a Proxy for both HomeA and HomeB.

Domains HomeB and HomeC use the relays for their Vias as well as for their Proxies. For example, domain HomeB uses relays HubB1 and HubB2 for both the Via and Proxy connections, and domain HomeC uses relays HubC1 and HubC2 for both the Via and Proxy connections. Domain HomeA, on the other hand, uses different relays for its Vias and Proxies. For example, domain HomeA can use relay HubA1 for its Via connection, and can use relay HubA2 for its Proxy connections.

Using the Routine Collection to Establish Cross-Domain Connections

In some embodiments, various VPC2 domains can communicate with each other by becoming members of a common VPC3 domain. For example, a VPC3 domain can include domain "HomeA" and another VPC2 domain "HomeD," thus providing a cryptographic association which allows devices in HomeA and HomeD to communicate with each other. However, the HomeA and HomeD domains may not have a direct communication channel with each other. HomeA and HomeD can analyze a set of existing Via configurations to determine communication paths to each other.

When HomeA and HomeD first associate, HomeD synchronizes HomeA's routing information. This routing information recursively includes the information for HomeB, and for HomeC. More specifically, HomeA's routing information includes a Vias/via_domains object, which itself includes a set of links to remote via_domain objects and/or to a local "relays" object. The local relays object indicates links for a set of endpoints which can be used to send and/or receive packets. For example, a link in HomeA's via_domains object can point to HomeB's via_domain object (e.g., point to /sen/HomeB/%C1.sen.routing/Vias/via_domains). Likewise, HomeB's via_domains object can point to HomeC's via_domain object (e.g., point to /sen/HomeC/%C1.sen.routing/Vias/via_domains). Hence, when the HomeD domain synchronizes the "Vias" collection from HomeA, the HomeD domain obtains the information for HomeA, HomeB, and HomeC. HomeD can route packets to HomeA by sending them to HomeC's Endpoint objects, as determined from HomeC's "relays" object.

When the HomeC domain receives a packet for HomeA (e.g., from HomeD), HomeC analyzes its via_domain object to determine how it should route data for HomeA. This is done by HomeC determining that HomeB (for which it is a Transit) is also a Transit for HomeA. For example, when HomeC first synchronizes HomeB's routing information, HomeC also recursively copies HomeA's transit object (e.g., "/sen/HomeA/%C1.sen.routing/Vias/transit_object"), which HomeC uses to determine that it should transit packets with a "HomeA" prefix through HomeB. During packet-forwarding, HomeD may connect to HomeC, HomeC may connect to HomeB, and HomeB may connect to HomeA, even though only HomeD and HomeA have a cryptographic VPC association (e.g., via the VPC3 domain).

Figure 4:
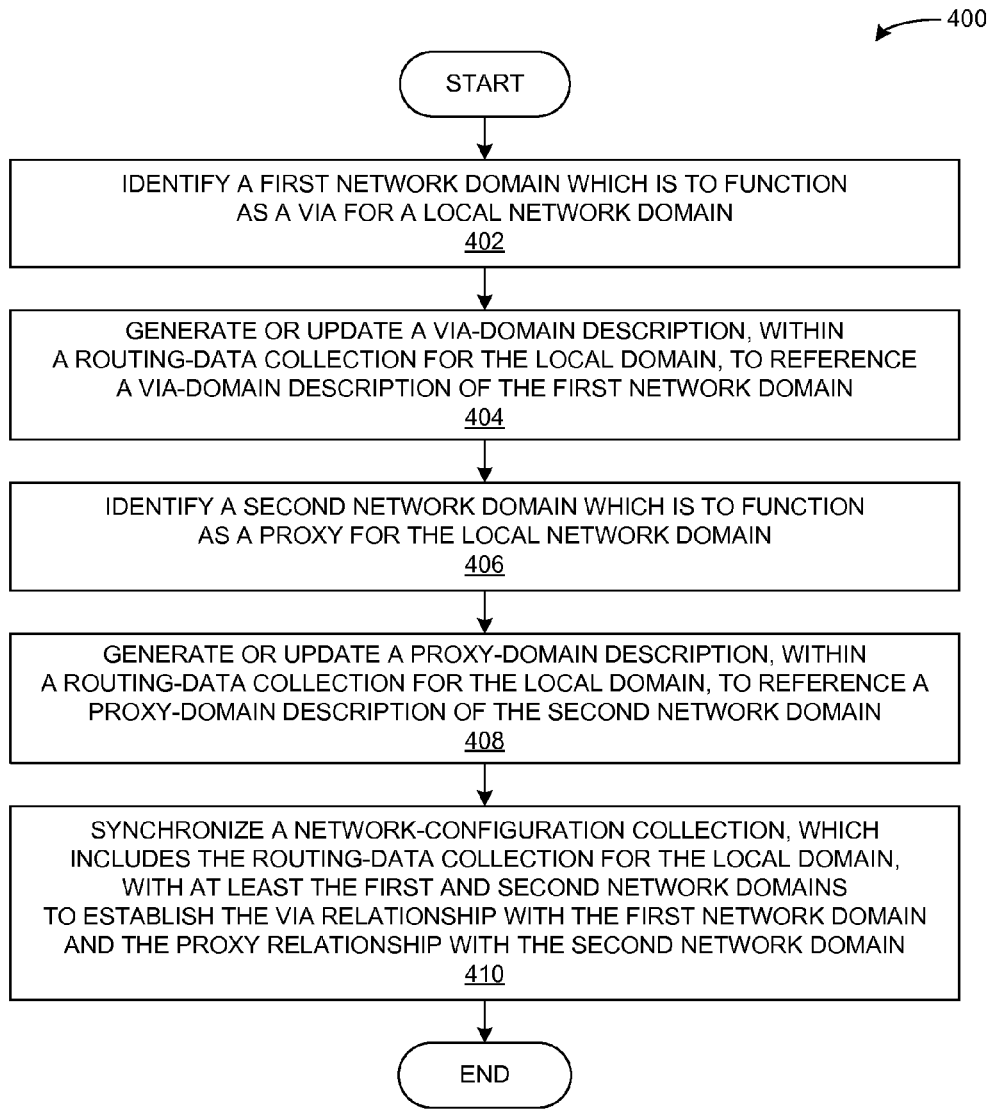
FIG. 4 presents a flow chart illustrating a method for establish directed network connections with peer network devices in accordance with an embodiment.

FIG. 4 presents a flow chart illustrating a method 400 for establishing directed network connections between network domains in accordance with an embodiment. During operation, the system identifies a first network domain which is to function as a via for a local network domain (operation 402). The system generates or updates a via-domain description, within a routing-data collection for the local domain, to reference a via-domain description of the first network domain (operation 404).

In some embodiments, the system can also identify a second network domain which is to function as a proxy for the local network domain (operation 406). If the system identifies and selects a proxy, the system generates or updates a proxy-domain description, within a routing-data collection for the local network domain, to reference a proxy-domain description of the second network domain (operation 408).

The system then synchronizes a network-configuration collection with at least the first and second network domains (operation 410). By synchronizing the network-configuration collection, which includes the routing-data collection for the local network domain, the system establishes the via relationship with the first network domain, and establishes the proxy relationship with the second network domain.

Figure 5:
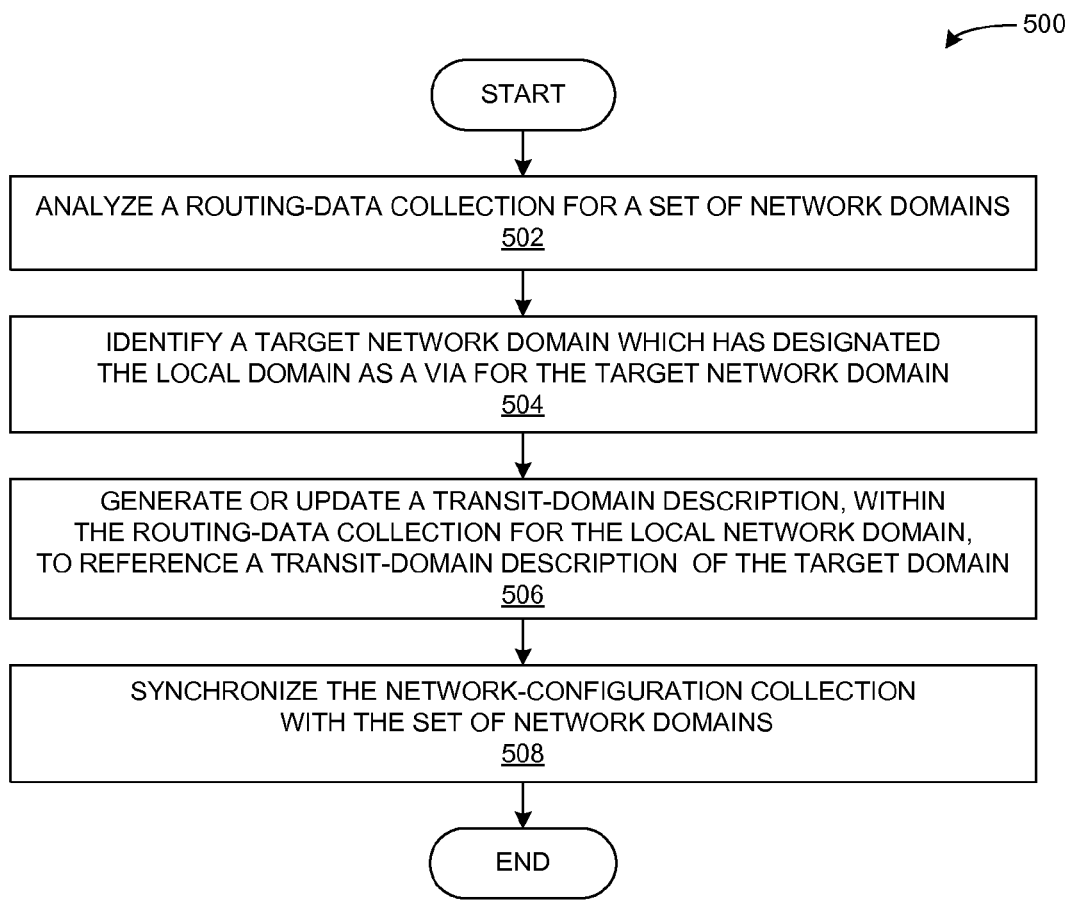
FIG. 5 presents a flow chart illustrating a method for configuring the local device to function as a transit to a remote network device in accordance with an embodiment.

FIG. 5 presents a flow chart illustrating a method 500 for configuring the local device to function as a transit to a remote network domain in accordance with an embodiment. During operation, the system analyzes a routing-data collection for a set of network domains (operation 502). These network domains can correspond to a predetermined set of network devices, such as in a Serviced-Enhanced Network (SEN).

The system identifies a target network domain which has designated the local domain as a via (operation 504). The system generates, or updates, a transit-domain description, for the local domain, to reference a transit-domain description of the target network domain (operation 506). For example, the local domain's routing-data collection may store a transit-domain description for the local domain, which indicates a set of network domains to which the local domain functions as a "transit." The system can update the existing transit-domain description to add a reference, or link, to a transit object for the target network domain that was identified during operation 504. However, if the local device's routing-data collection may not yet store a transit-domain description for the local domain, the system can generate the transit-domain description so that it includes at least the reference to the transit object for the target network domain.

Recall that the network-configuration collection can include the routing-data collection for the local domain, as well as for a set of other network domains in a service-enhanced network. Hence, to disseminate the transit-domain description to the set of network domains, the system synchronizes the network-configuration collection with devices that are members of these domains (operation 508). This reference allows a device of the local domain, or of other network domains that have synchronized the network-configuration collection with the local domain, to identify a directed path to the target network device of the SEN through one or more "transits."

Via Relationships

A Via is a statement by a VPC domain that the local VPC domain can be reached via a different VPC domain. The Via is a statement of inbound reachability, which does not restrict the outbound connections of the local domain. A standard operation for Vias works as follows. When a domain "A" specifies one or more other domains $\{V_1, V_2, \ldots, V_k\}$ as its Vias, a third-party domain "B" routing packets to domain A can recursively look up the routing information for the Vias, starting with the Vias for domain A. Domain B can use the recursive routing information to reach A.

If a domain B is listed as a Via for domain A, domain B connects directly to domain A to avoid creating a forwarding loop. In some embodiments, if a domain $V_i$ is configured to function as a Via for domain A, domain A is allowed to connect directly to domain $V_i$ when a critical event occurs (e.g., a state change that makes a device's Endpoints unreachable) or if A is VPC-associated with $V_i$, even if domain $V_i$ has a set of Vias that do not include domain A. Also, domain A is not required to route outbound packets through its Vias, as domain A may connect directly to any other domain, as permitted by their Vias.

In some embodiments, if all nodes within a given network advertise symmetric Vias (as in an OSPF style network) or bi-directional Vias (as in a BGP style network), the network's graph forms a fixed topology link state graph. For example, domains A and B can establish a symmetric bi-directional connection when domain A specifies domain B as its Via, and domain B specifies domain A as its Via.

In some embodiments, a local domain can make a "call" to another domain using a proof system. One form of proof would include a source end-node presenting proof of its relationship with a destination end-node as a valid reason to call a Via. For example, domain C can include a Via for domain B, and domain B can include a Via for domain A. If domain D is associated with domain A, then it should be possible for a device in domain D to call a Via in domain C to establish the route D→C→B→A. When placing the call to a device in domain C, the domain D device would present a proof of association with domain A to the domain C device. To accept the call, the domain C device performs a recursive lookup to determine whether the domain C device is a valid Via for reaching domain A. For example, the domain C device can determine that it is a Via for domain B, and recursively verifies that domain B is a Via for A, such that domain A would accept the call because domain A knows that domain B is a Via for domain A.

However, if a network domain is configured to route packets without using such a proof system, then each Via may accept a call from any device, and can route traffic for VPC-associated domains and for its Transit domains (the domains for which it is a Via). The verification would be performed by the end host devices (e.g., the devices at the two ends of the network path) to verify that they are configured or provisioned to communicate with each other, either directly or through a set of Vias.

In some embodiments, a domain's VCA registers the appropriate prefixes when connecting to a Via. These registered prefixes are asymmetric, based only on the Via relationships and direct connections. For example, building on the example from above, when domain D calls domain C to reach domain A, domain D registers a prefix of domain A on the face to domain C. Domain D may also register any other prefixes for which domain C is a Via, and may register domain C if domain D is VPC-associated with domain C. If domain C is VPC-associated with domain D, Domain C would register the prefix to domain D.

Furthermore, when domain C calls domain B to reach domain A, domain C registers domain A on the face. Domain C may also register domain B on the face if they are VPC-associated. However, domain B would only register domain C on the face if they are VPC-associated, but domain B does not register domain D on the face.

Then, when domain B calls domain A, domain B registers domain A on the face. Domain A would register domain B on the face if domains A and B are VPC-associated. The result is a directed path D→C→B→A, with the prefixes "/sen/sync" and "/sen/HomeA" registered on the domains along the path. The reverse path does not necessarily exist from domain A to domain D, unless such a path is established using a corresponding set of Vias.

Interests can flow from domain D to domain A, and replies are propagated back to domain D due to reverse path forwarding using a Pending Interest Table (PIT). Each reply indicates a structured name associated with an interest, and the PIT maps a structured name or prefix to a corresponding pending interest. Hence, the domains along a path can use their corresponding PIT to determine a reverse path for forwarding each reply, without having to establish such a communication path using Vias. A path from domain A to domain D would only be built for communicating packets other than replies if the Vias along the path are symmetric (D<->C<->B<->A). If the Vias are asymmetric, then domain A would need to establish its own forwarding path to domain D using these symmetric Vias.

Proxy Relationships

As mentioned above, a Proxy provides an outbound relay for a domain. Proxies can be used to direct outbound traffic through a different path than inbound traffic. An outbound relay is useful in various scenarios, such as to configure a VPC1 domain to use a local hub to route packets to a VPC3 domain of which the hub is not a member. Another example is to configure a device within a Direct network to route packets using a predetermined hub.

Recall that a device A is allowed to connect to a device B if devices A and B are VPC related to each other. For example, device A can connect to device B if both devices A and B belong to the same VPC domain, or if they belong to different domains that are VPC related. In some embodiments, if device A does not communicate with other devices directly, device A can designate a proxy to forward device A's outbound packets. For example, a hub HA is normally not allowed to connect to device B if hub HA is not VPC related to device B. However, if device A designates hub HA as its proxy (e.g., in the "proxy_domains" collection for device A), device B can accept a connection from hub HA as if it were a connection from device A.

When a target device receives a call through a Proxy, the target device can establish the connection after identifying a VCA for the source device being proxied, and determining that the target device is VPC related to the source device. For example, the target device can determine the identity of the source device, as well as the Endpoints for the source device, by performing a recursive link lookup starting from the source device's "Proxy" collection. In some embodiments, the source device's VCA can embed a cryptographic identifier (ID) (e.g., a public key or digital certificate) in its Endpoints table, which allows other devices to obtain the cryptographic ID during the recursive link lookup through the "Routing" collection. Hence, because the cryptographic ID is recursively synchronized, devices that receive a call through a DTLS tunnel can identify the calling device as a proxy for a VPC-related domain, and proceeds to register the VPC-related domain on the face.

Supernode Endpoints

A supernode is a device that specifies one or more of its Endpoints as excellent peering interfaces that may handle the traffic of many other devices. Note that the supernode specification is Endpoint specific. For example, a custodian device can have its Ethernet interface, which has a high-bandwidth Internet connection, configured to be a supernode Endpoint. On the other hand, the custodian device's Wi-Fi interface may not have a high-bandwidth connection, and so the custodian device's Wi-Fi interface may be reserved for use by the custodian device, and not for accepting connections from other devices.

A device's Endpoint(s) can be configured to function as a supernode either manually by an administrator, or automatically (e.g., by a computer without human intervention). An automated system can establish and/or destroy supernode Endpoints within a domain, dynamically at run-time, based on a performance metric computed for the device Endpoints. Once a device's Endpoint is designated as a supernode, the device updates the Endpoints table to indicate which Endpoints are "supernode" Endpoints, and advertises these supernode Endpoints through special Groups Table entries.

In some embodiments, the supernode designation has a Tier parameter, which facilitates multi-level peering. For example, a supernode Endpoint can make a small number of outbound connections to higher-tier devices (e.g. limited to a higher-tier-threshold number of connections), a few outbound connections to same-tier devices (e.g. limited to a same-tier-threshold number of connections). Further, the supernode Endpoint can make many connections to lower-tier devices, such as an unlimited number of connections, or a number of connections limited by a substantially large lower-tier-threshold number.

In some embodiments, Tier 0 members are non-forwarding group members, such as IMDs. Tier 0 devices may not route Interests for the group, and they may be "do-not-call" devices, in which case they only participate in the VPC3 when they call a Tier 1 device. Tier 0 devices can include end host devices, such as telephones and smartphones.

Tier 1 members are forwarding group members, such as hub members, or other unrestricted devices such as laptop computers or desktop computers. Further, Tier 2+ members are supernode members, which have been selected as good relay nodes. Tiers above level 2 can be used to give a logarithmic depth to the supernode configuration. For example, supernodes can be assigned to various different Tier 2+ levels to form a multi-root supernode tree, where a device can have more than one connection to different parents in a higher Tier.

Figure 6:
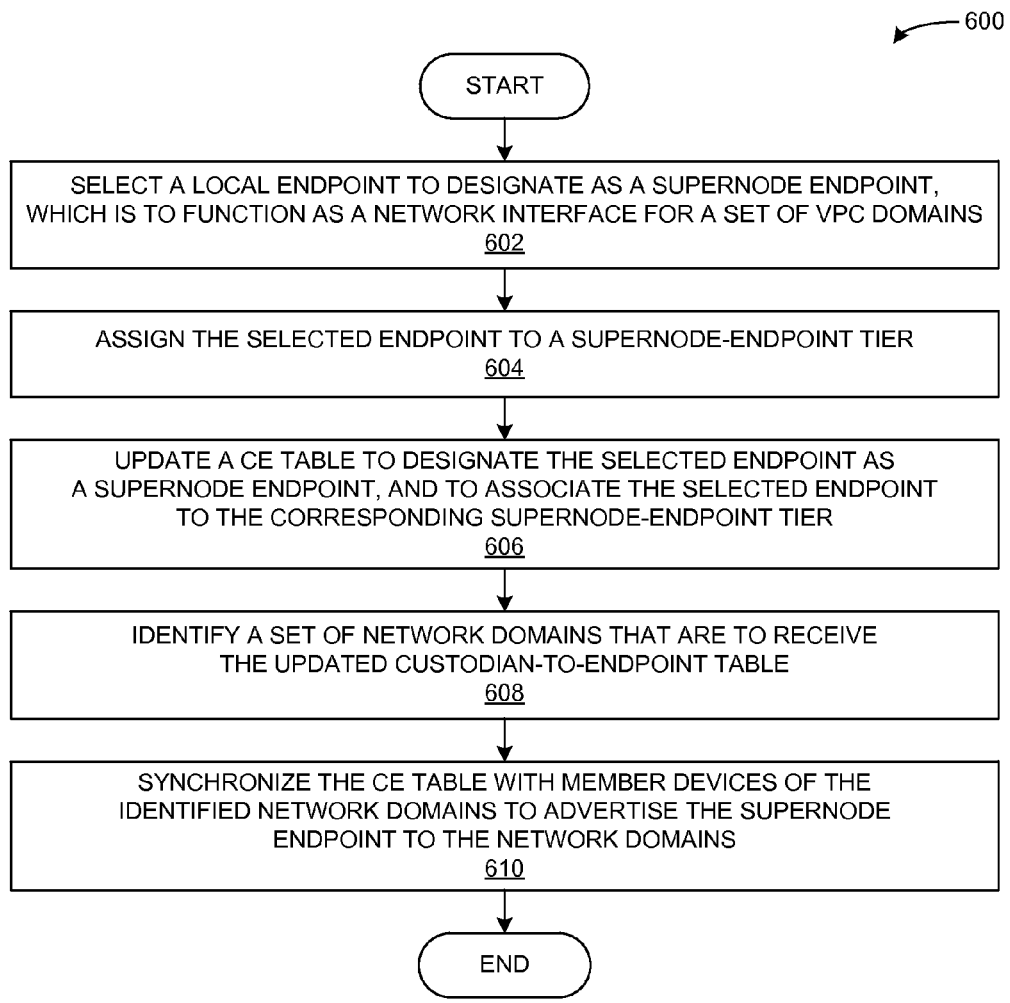
FIG. 6 presents a flow chart illustrating a method for configuring the local device to function as a supernode for a set of peer network devices in accordance with an embodiment.

FIG. 6 presents a flow chart illustrating a method 600 for configuring an endpoint of the local device to function as a supernode endpoint for a set of peer network devices in accordance with an embodiment. During operation, the system selects a local endpoint to designate as a network interface for a VPC domain (operation 602), and assigns the selected endpoint to a supernode-endpoint tier (operation 604). The supernode-endpoint tier can include a VPC tier level of 2 or higher, which are reserved for supernode endpoints. This allows the computer network to form a multi-root supernode tree, which can achieve a logarithmic-complexity performance when establishing connections between a plurality of VPC domains.

In some embodiments, during operation 602, the system can select the endpoint to use as a supernode endpoint by computing one or more performance metrics for the endpoint. One exemplary performance metric can include a slow-changing performance metric $n_i$ for a node i, such by computing an Internet bandwidth times a percent uptime for node i. Another exemplary performance metric can include weighing nodes by their fitness or performance (e.g., a quality of an Internet connection), and designating a predetermined number of highest-weighted nodes as supernodes. A further exemplary performance metric can include a rapid-changing performance metric $k_i$ for node i, such as by computing a total number of connections through a device over a predetermined time period (e.g., 30 minutes, or one hour). For example, $k_i$ can indicate an actual connection degree of node i, or an object forwarding rate of node i.

The system then updates a custodian-to-endpoint (CE) table to designate the selected endpoint as a supernode endpoint, and to associate the selected endpoint to the corresponding supernode tier (operation 606). Further, the system identifies a set of network domains with which to synchronize the updated CE table (operation 608), and synchronizes the CE table with member devices of the identified network domains to advertise the supernode endpoint to these network domains (operation 610).

Using Configuration Information from the Routing Collection

In some embodiments, the system stores a description for a plurality of local endpoints for a local device, such as under the device's "routing" collection that stores the routing-configuration information (e.g., under the namespace /sen/DeviceA/%C1.sen.routing/). The device may have one or more Endpoints, such that each Endpoint provides a method by which another network node may contact the custodian, such as using SIP/DTLS or Direct Broadcast. The local device may use the communication method on one network interface, or a set of network interfaces. For example, the system may use the same SIP rendezvous on both a Wi-Fi interface and a Cellular interface. As another example, the system may use a Direct Broadcast method only on an Ethernet connection.

The local device's "routing" collection may also store the Vias and Proxies properties, for example, as global properties for the device. This allows any application running on the local device to communicate with other devices using the globally-configured Vias and Proxies properties. In some embodiments, the system may store additional information in the Vias and Proxies properties to indicate a set of Domains that are allowed to use the Vias and Proxies properties. For example, these additional properties may restrict access to the Vias and Proxies to a given set of applications running on the local device. Also, these additional properties may restrict which data packets (or types of data packets) may be sent through a given Proxy or received through a given Via.

Further, a Vias or Proxies property may specify a <Metric> measure per Endpoint, which indicates a measure of its quality, such as its Object throughput or bandwidth. Further, Vias or Proxies property can also specify a global property <CommunityDegree>, which indicates a number of other VPC3 domains to which the local domain is a member. The system can use the CommunityDegree property, for example, when performing the multi-community Watts-Strogatz algorithm to weight a node's fitness to be a peering point, or when performing the dynamic supernode-election analysis to elect a supernode endpoint.

In some embodiments, the system can also use information stored under the local domain's "routing" collection (also referred to as the routing-data collection) to maintain a CE table. The system may update the CE table when the connectivity state has changed for a local endpoint, or when a remote VPC domain has synchronized its routing-data collection to advertise a change in a connectivity state for one of its endpoints.

Figure 7:
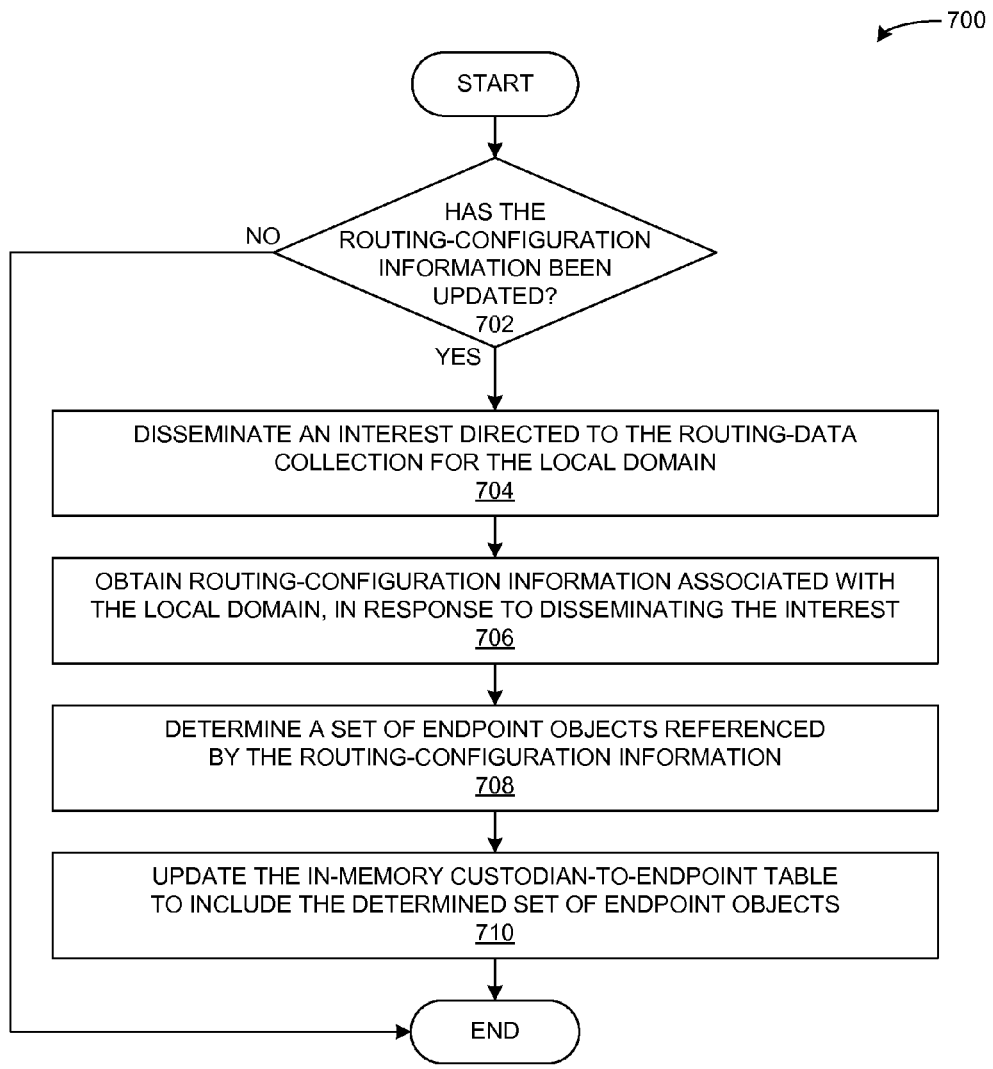
FIG. 7 presents a flow chart illustrating a method for updating a custodian-to-endpoint (CE) table in accordance with an embodiment.

FIG. 7 presents a flow chart illustrating a method 700 for updating a CE table in accordance with an embodiment. During operation, the system determines whether the routing-configuration information has been updated in the "routing" collection (operation 702). If so, the system can obtain the updated routing-configuration information from the routing-data collection. For example, the system can disseminate an interest directed to the routing-data collection for the local VPC domain (operation 704), and obtains the routing-configuration information from a response to the interest (operation 706). The system then determines a set of endpoint objects referenced to by the local domain's routing-configuration information (operation 708), and updates the in-memory CE table to include the set of endpoint objects (operation 710).

Figure 8:
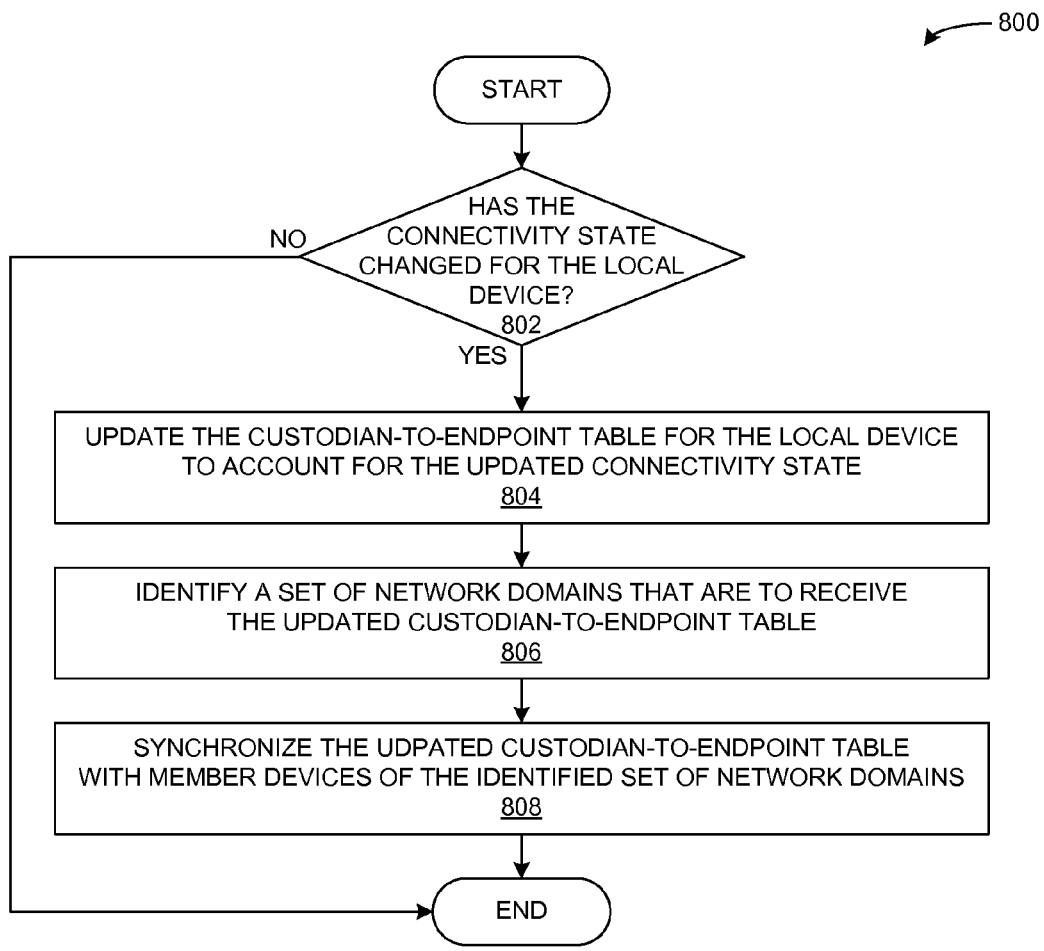
FIG. 8 presents a flow chart illustrating a method for synchronizing a local update to the custodian-to-endpoint table with a set of network peers in accordance with an embodiment.

FIG. 8 presents a flow chart illustrating a method 800 for synchronizing a local update to the CE table with a set of network domains in accordance with an embodiment. During operation, the system determines whether a connectivity state has changed for an endpoint of the local domain (operation 802). For example, the system can determine whether a critical event has occurred, such as when an endpoint loses a network connection to another VPC domain. If so, the system updates the CE table for the local device to account for the updated connectivity state (operation 804). The system then identifies a set of network domains that are to receive the updated CE table (operation 806), and synchronizes the CE table with other member devices of the identified network domains (operation 808).

Packet Forwarding

Figure 9:
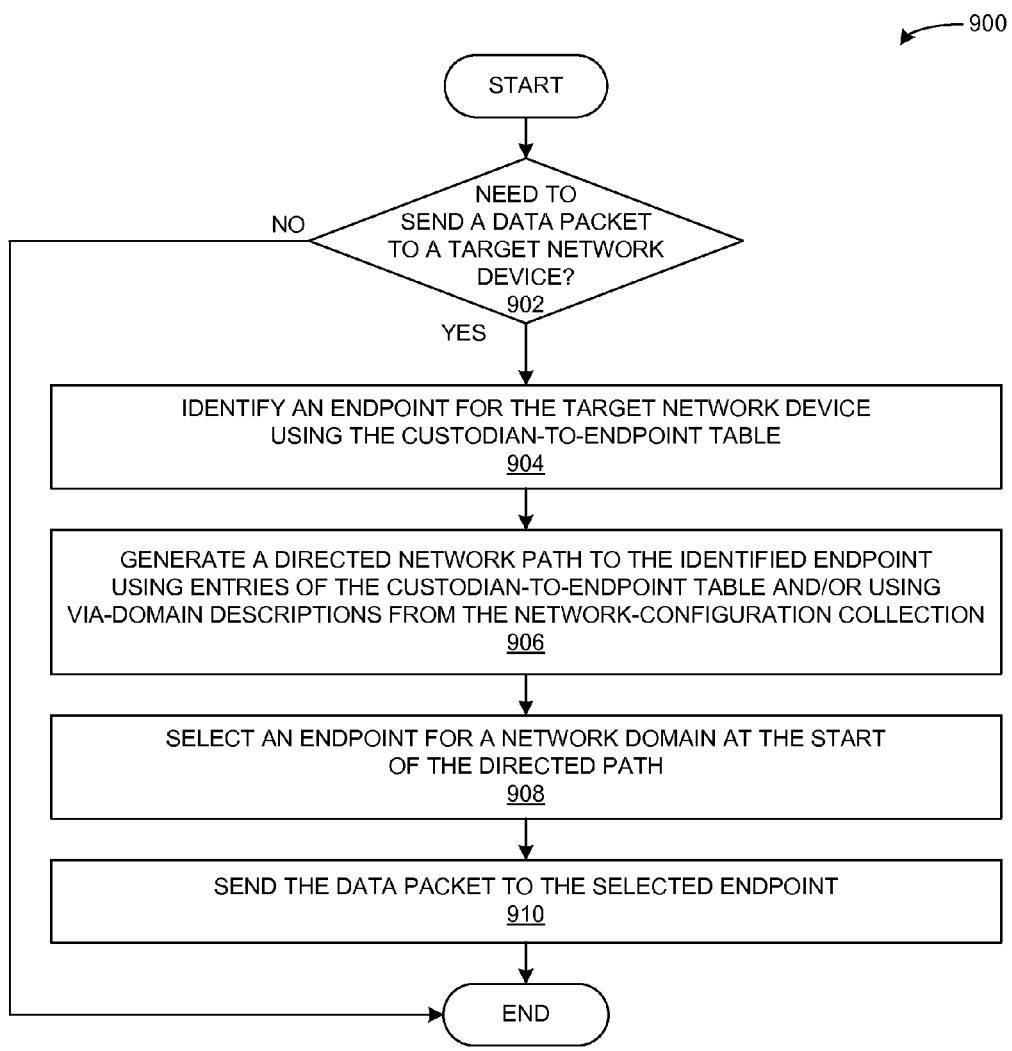
FIG. 9 presents a flow chart illustrating a method for sending a network packet to a content custodian based on the custodian-to-endpoint table in accordance with an embodiment.

FIG. 9 presents a flow chart illustrating a method 900 for sending a network packet to a content custodian based on the CE table in accordance with an embodiment. During operation, the system determines whether the local device needs to send a data packet to a target network device (operation 902). If so, the system identifies an endpoint for the target network device, for example, by performing a lookup in the CE table (operation 904).

The system then generates a directed network path to the identified endpoint based on the routing-configuration information (operation 906). For example, the system may identify the set of device endpoints that form the directed network path based on the CE table and/or using via-domain descriptions from the network-configuration collection for the local domain or other network domains.

Once the system has identified the network path to the target device, the system can select an endpoint for a network domain at the start of the directed path (operation 908). This endpoint is a peering endpoint configured to forward packets from the local device toward the target network device, such as a proxy to the local network device. The system then sends the data packet to the selected endpoint (operation 910).

During operation 906, when the system needs to forward a packet to a target device, the system may search through the "routing" collection associated with the local domain to identify supernodes, Vias, or hubs that can be used as constraints during a graph search operation. If no such entities are found, the system performs an unconstrained or randomized graph search on an unstructured network graph, which requires the system to obtain connectivity information from a large set of device endpoints until a path is found that reaches the target device. Hence, this randomized graph search operation is not the most efficient, and may consume an undesirably-large amount of memory as the connectivity information for the large set of network peers is kept in active memory by the graph-search operation.

However, if the system identifies supernodes, Vias, and/or hubs, the system can use these entities to create a topological constraint when searching for a path to the remote device. For example, recall that the CE table can indicate which endpoints are elected to function as supernodes, and may indicate a tier level for each of these supernodes. In some embodiments, the system can retain the information associated with these supernode endpoints in active memory (e.g., random access memory, or RAM), while storing the information for other endpoints in a non-volatile storage (e.g., in the "routing" collection).

Hence, if the in-memory supernodes can form a path to a target domain, the system can successfully perform graph search using only the in-memory supernode endpoints (e.g., a small number of graph nodes), which can minimize the computation and memory overhead associated with performing the graph search operation. However, even if the in-memory supernodes are not capable of forming a complete path to a given target domain, the system can access the "routing" collection (e.g., in non-volatile storage) to identify other non-supernode endpoints which can complete the path to the target domain.

The graph search operation exploits the multi-community social graph structure of VPC3 domains. For small groups, say under 16 nodes, the system can use an average node degree of $\lambda=2$ during the graph search, and still preserve the average path lengths within a desirable length. For larger graphs, the system can use an average node degree of 4 during the graph search to keep the average path length under 4, even for substantially large graphs (e.g., thousands of members). The actual average node degree distribution traversed to detect a path resembles a Poisson distribution with a peak at $\lambda=2$ or $\lambda=4$, depending on the graph size.

Supernodes use explicit designations of certain distinguished members as supernodes. For example, members with stable, high bandwidth Internet connections could be elected as supernodes. The system allows an arbitrary number of supernode Tiers to create a tree structure. The system can also allow a small number of same-tier connections to provide shortcuts for the graph search operation, and provide resiliency to the supernode tree structure.

The top-level of the tree would be Graph Search connected to keep the VPC3 domains connected. The shortcuts between nodes at the same Tier levels can also use the Graph Search mechanisms. As with hub-based routing in a VPC2 domain, devices would keep performance data for their supernode endpoints and exploit this data to select and use at least one good supernode to route packets, and randomly probes this supernode and/or other supernodes over time with a second connection to maintain recent performance data.

Recall that non-forwarding nodes belong to Tier 0, forwarding nodes belong to Tier 1, and supernodes belong to Tier 2+. In some embodiments, a non-forwarding node only needs to store data for members that belong to its immediately above Tier (e.g., for a set of forwarding members in Tier 1). A forwarding node only needs to store data for members of its own Tier, and the adjacent Tiers (e.g., members of Tiers 0, 1, and 2).

In some embodiments, the system can present the user with an alert message if a domain experiences a configuration error that prevents establishing a routing path, such as when all domain members are non-forwarders or are "do-not-call" members. A device's VCA can present the alert message, for example, through a Short Messaging Service (SMS) text message on the phone, or using a modal window (e.g., an Android Toast pop-up message). If two smartphones, for example, are creating a VPC3× domain between them, one or both devices should explicitly make itself at least a "call-allowed" member, even if they remain non-forwarding for the namespace.

Figure 10:
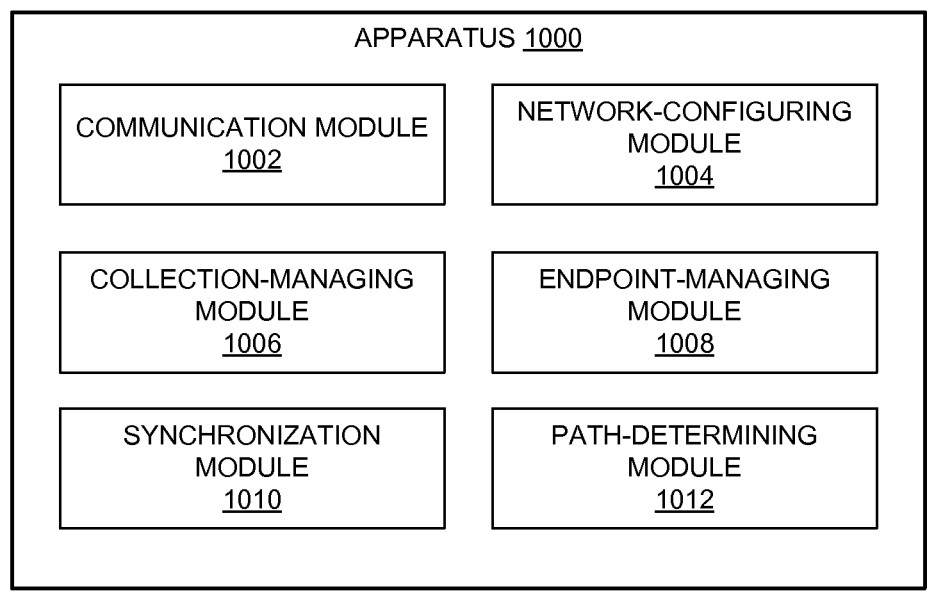
FIG. 10 illustrates an exemplary apparatus that facilitates establishing and using a set of directed network connections to communicate with a set of peer network devices in accordance with an embodiment.

FIG. 10 illustrates an exemplary apparatus 1000 that facilitates establishing and using a set of directed network connections to communicate with a set of peer network devices in accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. Specifically, apparatus 1000 can comprise a communication module 1002, a network-configuring module 1004, a collection-managing module 1006, an endpoint-managing module 1008, a collection-synchronizing module 1010, and a path-determining module 1012.

In some embodiments, communication module 1002 can send and/or receive packets for apparatus 1000. Network-configuring module 1004 can select other domains or endpoints to use as Vias, Proxies, hubs, and/or Supernodes for a VPC domain to which apparatus 1000 is a member. Collection-managing module 1006 can access or update a network-domain collection associated with apparatus 1000. For example, collection-managing module 1006 can update a routing-data collection for apparatus 1000 to designate a Via, Proxy, hub, or Supernode for the local domain.

Endpoint-managing module 1008 can access or update a custodian-to-endpoint table for apparatus 1000. Collection-synchronizing module 1010 can synchronize the network-data collection with one or more member devices of other network domains. Path-determining module 1012 can access the routing-data collection, a prefix-to-custodian table, and/or the custodian-to-endpoint table to generate a directed network path to a target endpoint of the computer network.

Figure 11:
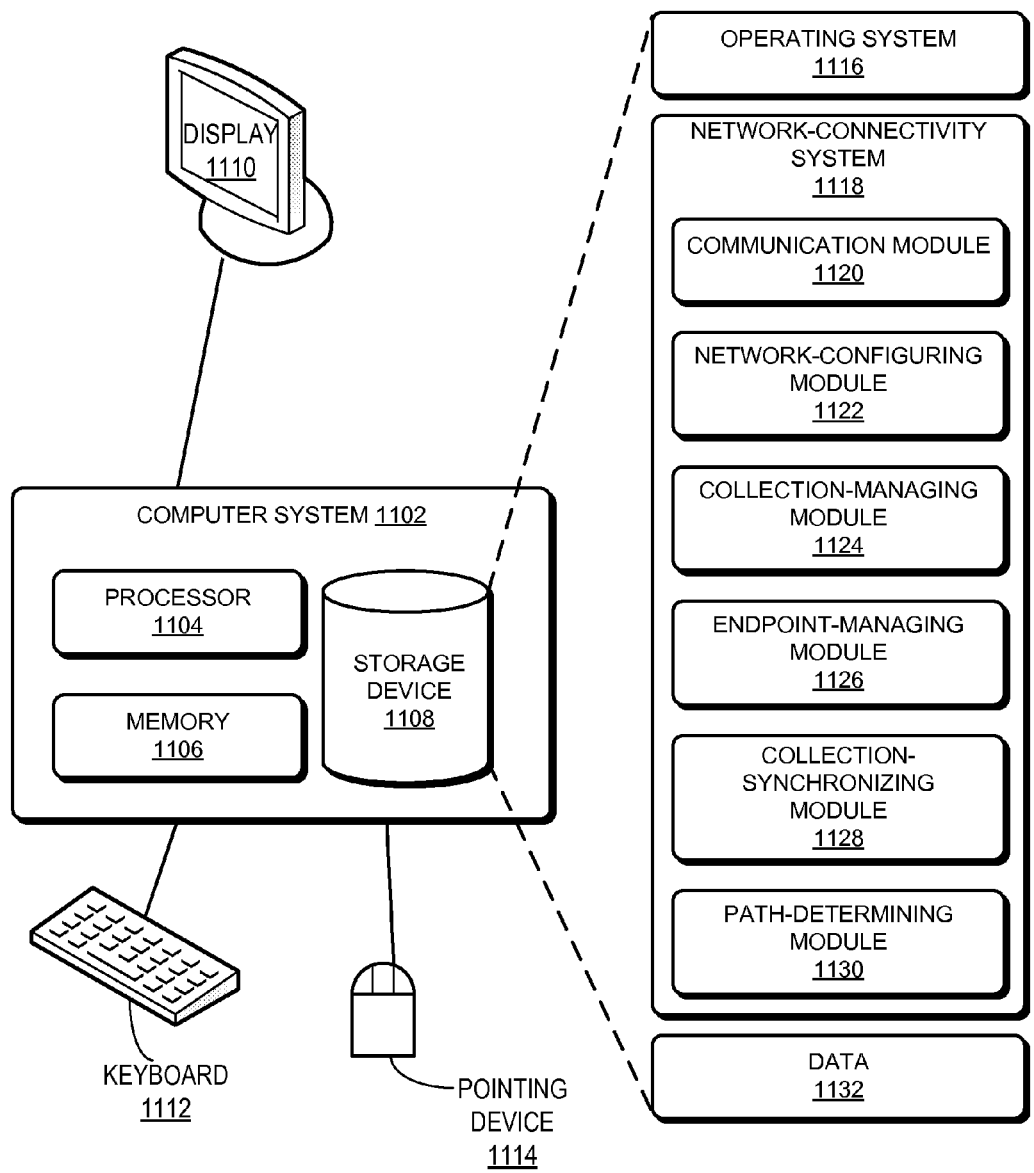
FIG. 11 illustrates an exemplary computer system that facilitates establishing and using a set of directed network connections to communicate with a set of peer network devices in accordance with an embodiment.

FIG. 11 illustrates an exemplary computer system 1100 that facilitates establishing and using a set of directed network connections to communicate with a set of peer network devices in accordance with an embodiment. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store operating system 1116, network-connectivity system 1118, and data 1126.

Network-connectivity system 1118 can include instructions, which when executed by computer system 1102, can cause computer system 1102 to perform methods and/or processes described in this disclosure. Specifically, network-connectivity system 1118 may include instructions for sending and/or receiving packets for computer system 1102 (communication module 1120). Further, network-connectivity system 1118 can include instructions for selecting other domains or endpoints to use as Vias, Proxies, hubs, and/or Supernodes for a VPC domain to which computer system 1102 is a member (network-configuring module 1122). Network-connectivity system 1118 can also include instructions for accessing or updating a network-domain collection associated with computer system 1102, such as to update a routing-data collection to designate a Via, Proxy, hub, or Supernode for the local domain (collection-managing module 1124).

Network-connectivity system 1118 can also include instructions for accessing or updating a custodian-to-endpoint table for computing device 1102 (endpoint-managing module 1126). Network-connectivity system 1118 can also include instructions for synchronizing the network-data collection with one or more member devices of other network domains (collection-synchronizing module 1128). Network-connectivity system 1118 can also include instructions generating a directed network path to a target endpoint of the computer network based on the routing-data collection, a prefix-to-custodian table, and/or the custodian-to-endpoint table to (path-determining module 1130).

Data 1126 can include any data that is required as input or that is generated as output by the methods and/or processes described in this disclosure. Specifically, data 1126 can store at least data which can be synchronized with other network devices, such as a network-data collection, a prefix-to-custodian table, and a custodian-to-endpoint table.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   determining, by a local computing device, a first network domain which is to function as a via for a local domain, wherein the via is to route data from other network devices to a predetermined endpoint of the local domain;
   updating a via-domain description, within a routing-data collection for the local domain, to reference a via-domain description of the first network domain, thereby establishing the first network domain as the via for the local domain; and
   synchronizing a network-configuration collection, which includes the routing-data collection for the local domain, with at least devices of the first network domain to provide the via-domain description to the first network domain.

2. The method of claim 1, further comprising:
   determining a second network domain which is to function as a proxy for the local domain, wherein the proxy is to communicate data to other network devices from a predetermined endpoint of the local domain;
   updating a proxy-domain description, within a routing-data collection for the local domain, to reference the proxy-domain description of the second network domain, thereby establishing the second network domain as a proxy for the local domain; and
   synchronizing the network-configuration collection, which includes the routing-data collection for the local domain, with at least devices of the second network domain to provide the proxy-domain description to the second network domain.

3. The method of claim 2, wherein the first and second network domains are different network domains, and wherein synchronizing the network-configuration collection involves:
   restricting the via-domain description from being provided to devices of the second network domain; and
   restricting the proxy-domain description from being provided to devices of the first network domain.

4. The method of claim 2, wherein the proxy configuration indicates one or more of:
   an endpoint of the local domain from which devices of other network domains may receive packets from the local domain; and
   a reference to the proxy-domain description for at least the second network domain.

5. The method of claim 1, wherein the the network-configuration description also includes a via configuration which indicates one or more of:
- an endpoint of the local domain, which other network domains may use to send packets to devices of the local domain; and
- a reference to the via-domain description of the first network domain.

6. The method of claim 1, further comprising:
- determining a third network domain which has referenced the local domain as a via;
- updating a transit-domain description, within the routing-data collection for the local domain, to reference a transit-domain description of the third network domain, thereby establishing the third network domain as a transit destination; and
- synchronizing the routing-data collection for the local domain with devices of other network domains to provide a transit configuration to the other network domains.

7. The method of claim 6, wherein the transit configuration indicates one or more of:
- an endpoint of the local domain, which devices of the other network domains may use to send packets for the third network domain; and
- a reference to the transit-domain description of the third network domain.

8. The method of claim 1, further comprising:
- selecting an endpoint of the local domain to designate as a supernode endpoint that is to function as a network interface for a set of network domains;
- assigning the selected endpoint to a supernode-endpoint tier;
- updating a custodian-to-endpoint table to designate the local endpoint as a supernode endpoint, and to associate the selected endpoint to the corresponding supernode-endpoint tier; and
- synchronizing the custodian-to-endpoint table with devices of other network domains to advertise the supernode endpoint to the other network domains.

9. The method of claim 1, further comprising:
- determining that the routing-data collection for the local domain includes an update to one or more routing-configuration descriptions;
- disseminating an interest directed to the routing-data collection for the local domain;
- in response to disseminating the interest, obtaining routing-configuration descriptions for the local domain;
- determining a set of endpoint objects referenced by the routing-configuration descriptions; and
- updating an in-memory custodian-to-endpoint table to include the determined set of endpoint objects.

10. The method of claim 1, further comprising:
- determining a target network device that is a destination for a data packet;
- identifying an endpoint for the target network device using a custodian-to-endpoints table;
- generating a directed network path to the identified endpoint based on via-domain descriptions for a plurality of network domains;
- selecting an endpoint for a network domain at the start of the directed network path; and
- sending the data packet to the selected endpoint.

11. A non-transitory computer-readable storage medium storing instructions that when executed by a computer cause the computer to perform a method, the method comprising:
- determining a first network domain which is to function as a via for a local domain, wherein the via is to route data from other network devices to a predetermined endpoint of the local domain;
- updating a via-domain description, within a routing-data collection for the local domain, to reference a via-domain description of the first network domain, thereby establishing the first network domain as the via for the local domain; and
- synchronizing a network-configuration collection, which includes the routing-data collection for the local domain, with at least devices of the first network domain to provide the via-domain description to the first network domain.

12. The storage medium of claim 11, wherein the method further comprises:
- determining a second network domain which is to function as a proxy for the local domain, wherein the proxy is to communicate data to other network devices from a predetermined endpoint of the local domain;
- updating a proxy-domain description, within a routing-data collection for the local domain, to reference the proxy-domain description of the second network domain, thereby establishing the second network domain as a proxy for the local domain; and
- synchronizing the network-configuration collection, which includes the routing-data collection for the local domain, with at least devices of the second network domain to provide the proxy-domain description to the second network domain.

13. The storage medium of claim 12, wherein the first and second network domains are different network domains, and wherein synchronizing the network-configuration collection involves:
- restricting the via-domain description from being provided to devices of the second network domain; and
- restricting the proxy-domain description from being provided to devices of the first network domain.

14. The storage medium of claim 12, wherein the proxy configuration indicates one or more of:
- an endpoint of the local domain from which devices of other network domains may receive packets from the local domain; and
- a reference to the proxy-domain description for at least the second network domain.

15. The storage medium of claim 11, wherein the network-configuration description also includes a via configuration which indicates one or more of:
- an endpoint of the local domain, which other network domains may use to send packets to devices of the local domain; and
- a reference to a via-domain description of the first network domain.

16. The storage medium of claim 11, wherein the method further comprises:
- determining a third network domain which has referenced the local domain as a via;
- updating a transit-domain description, within the routing-data collection for the local domain, to reference a transit-domain description of the third network domain, thereby establishing the third network domain as a transit destination; and
- synchronizing the routing-data collection for the local domain with devices of other network domains to provide a transit configuration to the other network domains.

17. The storage medium of claim 11, wherein the method further comprises:
 selecting an endpoint of the local domain to designate as a supernode endpoint that is to function as a network interface for a set of network domains;
 assigning the selected endpoint to a supernode-endpoint tier;
 updating a custodian-to-endpoint table to designate the local endpoint as a supernode endpoint, and to associate the selected endpoint to the corresponding supernode-endpoint tier; and
 synchronizing the custodian-to-endpoint table with devices of other network domains to advertise the supernode endpoint to the other network domains.

18. The storage medium of claim 11, wherein the method further comprises:
 determining that the routing-data collection for the local domain includes an update to one or more routing-configuration descriptions;
 disseminating an interest directed to the routing-data collection for the local domain;
 in response to disseminating the interest, obtaining routing-configuration descriptions for the local domain;
 determining a set of endpoint objects referenced by the routing-configuration descriptions; and
 updating an in-memory custodian-to-endpoint table to include the determined set of endpoint objects.

19. The storage medium of claim 11, wherein the method further comprises:
 determining a target network device that is a destination for a data packet;
 identifying an endpoint for the target network device using a custodian-to-endpoints table;
 generating a directed network path to the identified endpoint based on via-domain descriptions for a plurality of network domains;
 selecting an endpoint for a network domain at the start of the directed network path; and
 sending the data packet to the selected endpoint.

20. An apparatus comprising: a processor; a memory; and a data storage device storing instructions that when executed implement modules comprising:
 a network-configuring module to determine a first network domain which is to function as a via for a local domain, wherein the via is to route data from other network devices to a predetermined endpoint of the local domain;
 a collection-managing module to update a via-domain description, within a routing-data collection for the local domain, to reference a via-domain description of the first network domain, thereby establishing the first network domain as a via the via for the local domain; and
 a collection-synchronizing module to synchronize a network-configuration collection, which includes the routing-data collection for the local domain, with at least devices of the first network domain to provide the via-domain description to the first network domain.

* * * * *